United States Patent
Randell et al.

(10) Patent No.: US 9,767,105 B2
(45) Date of Patent: Sep. 19, 2017

(54) METHOD AND APPARATUS FOR MANAGING DATA

(71) Applicant: Viavi Solutions UK Limited, Berkshire (GB)

(72) Inventors: Nicholas James Randell, Hants (GB);
Peter Kenington, Chepstow (GB);
Christopher Drawater, Reading (GB)

(73) Assignee: Viavi Solutions UK Limited, Berkshire (GB)

( * ) Notice: Subject to any disclaimer, the term of this patent is extended or adjusted under 35 U.S.C. 154(b) by 310 days.

(21) Appl. No.: 14/103,518

(22) Filed: Dec. 11, 2013

(65) Prior Publication Data
US 2015/0161148 A1    Jun. 11, 2015

(51) Int. Cl.
 *G06F 17/30* (2006.01)
 *G06F 3/06* (2006.01)

(52) U.S. Cl.
 CPC ........ *G06F 17/30085* (2013.01); *G06F 3/067* (2013.01); *G06F 3/0608* (2013.01); *G06F 3/0652* (2013.01)

(58) Field of Classification Search
 CPC .............................. G06F 17/30286
 USPC ....................................... 707/662
 See application file for complete search history.

(56) References Cited

U.S. PATENT DOCUMENTS

| | | | | |
|---|---|---|---|---|
| 7,613,212 B1 * | 11/2009 | Raz | ........ | H04J 3/0641 370/510 |
| 2004/0003064 A1 * | 1/2004 | Astley | ........ | H04L 67/306 709/223 |
| 2005/0055512 A1 * | 3/2005 | Kishi | ........ | G06F 12/0804 711/135 |
| 2006/0075007 A1 * | 4/2006 | Anderson | ........ | G06F 3/0608 |
| 2008/0199010 A1 * | 8/2008 | Ogawa | ........ | H04N 5/4401 380/255 |

FOREIGN PATENT DOCUMENTS

WO    WO 2010/081658    7/2010

OTHER PUBLICATIONS

Extended European Search Report corresponding to EP 14 19 7471, mailed Jul. 3, 2015, 7 pages.
Brooks et al., "IBM Tivoli Storage Management Concepts", May 2006, XP007923160, 34 pages.

* cited by examiner

*Primary Examiner* — Hosain Alam
*Assistant Examiner* — Tuan-Khanh Phan
(74) *Attorney, Agent, or Firm* — Harrity & Harrity, LLP (57) ABSTRACT

A method of managing data for at least one wireless communication network and a data management system for implementing such a method are provided. The method comprises determining at least one free space metric for at least one data storage device and comparing the at least one determined free space metric for the at least one data storage device to at least one threshold value. If the at least one determined free space metric for the at least one data storage device exceeds the at least one threshold value, the method further comprises identifying data object groups represented by data objects stored within the at least one data storage device, determining a retention priority value for each identified data object group, determining at least one data object group for which to retire data objects based at least partly on the determined retention priority values, and retiring data objects within the determined at least one data object group from the at least one data storage device.

20 Claims, 6 Drawing Sheets

METHOD AND APPARATUS FOR MANAGING DATA

FIELD OF THE INVENTION

The field of the invention relates to a method of managing data for at least one wireless communication network, and a data management system therefor.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org).

The $3^{rd}$ and $4^{th}$ generations of wireless communications, and particular systems such as LTE (Long Term Evolution), have generally been developed to support macro-cell mobile phone communications, and more recently femto-cell mobile phone communications. Here the 'phone' may be a smart phone, or another mobile or portable communication unit that is linked wirelessly to a network through which calls etc. are connected. Henceforth all these devices will be referred to as mobile communication units. Calls may be data, video, or voice calls, or a combination of these.

Typically, mobile communication units, or User Equipment as they are often referred to in 3G parlance, communicate with a Core Network of the 3G or 4G wireless communication system. This communication is via a Radio Network Subsystem. A wireless communication system typically comprises a plurality of Radio Network Subsystems. Each Radio Network Subsystem comprises one or more cells, to which mobile communication units may attach, and thereby connect to the network. A base station may serve a cell. Each base station may have multiple antennas, each of which serves one sector of the cell.

Operators of wireless communication systems need to know what is happening in the system, with as much precision as possible. A particular issue is the need to solve 'faults'. Faults may take a wide variety of forms, but can be summarised as events when the network and/or one or more mobile communication units do not perform as expected.

Modern wireless communication systems allow a high degree of autonomy to individual mobile communication units and to base stations. As a consequence, decisions about setting up and 'tearing down' call links throughout the network are not all made centrally. As a result, an additional complication arises from the volume of information generated within the wireless communication system. In one day, a wireless communication system may generate 100 gigabytes of data about calls that have been made in the network.

This volume of data has proved a major obstacle to fault location in existing wireless communication systems. In particular, conventional data management techniques have proved to be inadequate for managing such large volumes of data, for example potentially in the billions (1,000 millions) of records or more.

A particular problem encountered by network operators in managing the large volumes of data that they collect is that of efficient and effective retirement of data once it is no longer required and/or when it is necessary to free up space for new data. Such retirement of data is necessary in order to provide some means of limiting the amount of data required to be stored. However implementing such retirement of data, in a manner that does not become a computational burden on the system, is a challenge.

The conventional approach to the retirement of time-stamped data is typically an 'oldest first' approach, whereby all data older than a particular time/date is retired. However, such an approach does not take into consideration factors such as the amount of free space that may be available and/or required for new data. Furthermore, such an approach does not enable the retention of different types/categories of data to be prioritised, for example whereby some types/categories of data may advantageously be retained for longer periods of time than other categories of data.

SUMMARY OF THE INVENTION

Accordingly, the invention seeks to mitigate, alleviate or eliminate one or more of the abovementioned disadvantages singly or in any combination.

According to a first aspect of the present invention, there is provided a method of managing data for at least one wireless communication network. The method comprises determining at least one free space metric for at least one data storage device, comparing the at least one determined free space metric for the at least one data storage device to at least one threshold value, and if the at least one determined free space metric for the at least one data storage device exceeds the at least one threshold value: identifying data object groups represented by data objects stored within the at least one data storage device; determining a retention priority value for each identified data object group; determining at least one data object group for which to retire data objects based at least partly on the determined retention priority values; and retiring data objects within the determined at least one data object group from the at least one data storage device.

In this manner, by determining a free space metric for the, or each, data storage device, and comparing the determined free space metric(s) to one or more minimum free space threshold value(s), the retirement of data objects may be limited to be performed as and when it is necessary to free up space within the data storage device(s) in order to store new data objects. In this manner, an "as much data as possible" retention policy may be implemented, whereby as much data as possible/practical may be retained for as long as possible/practical, based on the limitations of the amount of storage space available within the storage device(s). Furthermore, by retiring data objects based on the retirement priority values of data object groups to which the data objects are assigned, the retention of data objects comprising data of greater interest may be prioritised ahead of the retention of data objects comprising data of lesser interest.

According to a second aspect of the present invention, there is provided a data management system comprising at least one data processing module arranged to implement the method of the first aspect of the present invention.

According to a third aspect of the present invention, there is provided a wireless communication system incorporating the data management system of the second aspect of the present invention.

According to a fourth aspect of the present invention, there is provided a non-transitory computer program product having computer-readable code stored thereon for programming a data processing module to perform the method of the first aspect of the present invention.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Examples of the invention will be described in terms of a system and a method for managing data within a wireless communication network, such as a network implemented in accordance with the $3^{rd}$ Generation (3G) and/or $4^{th}$ Generation (4G) of mobile telephone standards and technology. Examples of such 3G and 4G standards and technology is the Universal Mobile Telecommunications System (UMTS™) and Long Term Evolution (LTE), developed by the $3^{rd}$ Generation Partnership Project (3GPP™) (www.3gpp.org).

In some examples, there is described a method comprising determining at least one free space metric for at least one data storage container, and comparing the at least one determined free space metric for the at least one data storage container to at least one threshold value. If the at least one determined free space metric for the at least one data storage container exceeds (e.g. is less than) the at least one threshold value, the method further comprises identifying data object groups represented by data objects stored within the at least one data storage container, calculating for each identified data object group a retirement priority value, determining at least one data object group for which to retire data objects based at least partly on the determined retirement priority values, and retiring data objects within the determined at least one data object group from the at least one data storage container.

Figure 1:
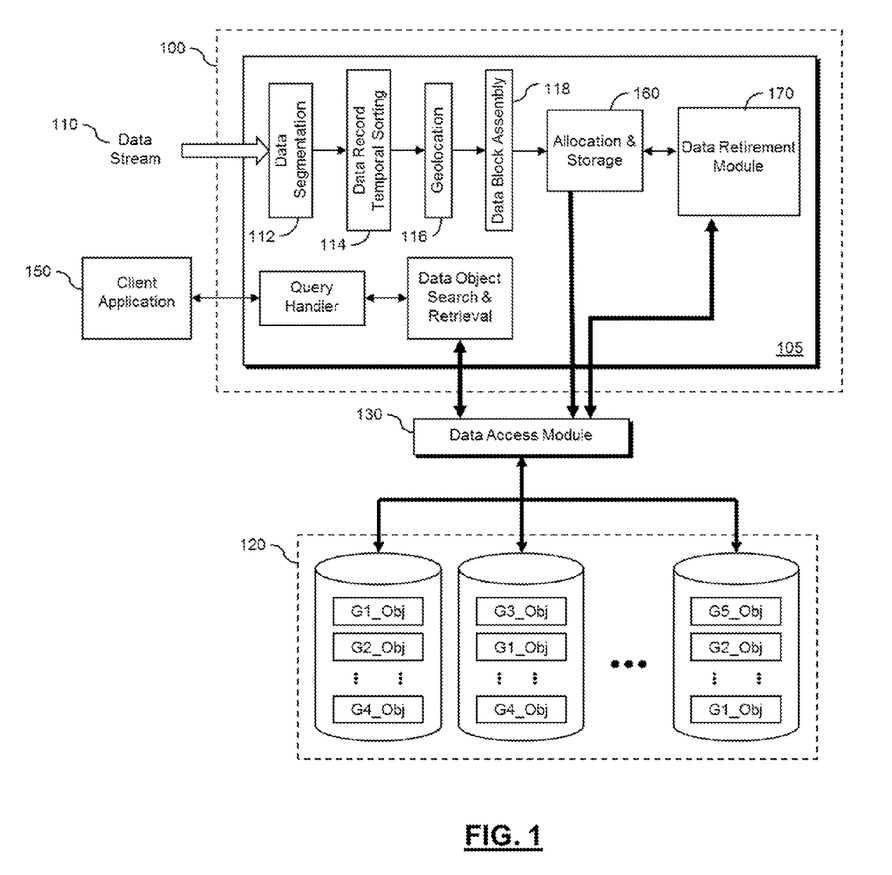
FIG. 1 illustrates a simplified block diagram of an example of a data management system.

Referring first to FIG. 1, there is illustrated a simplified block diagram of an example of a data management system 100 such as may be used for storing and subsequent access of data from one or more wireless communication networks. The data management system 100 may be implemented in any suitable manner. For example, and as illustrated in FIG. 1, the data management system 100 may be implemented by way of computer program code, and arranged to be executed on one or more data processing modules, such as the data processing module illustrated generally at 105. The computer program code may be stored within one or more non-transitory computer program products, for example such as one or more memory element(s). Such memory element(s) may comprise any form of computer-readable storage device, such as a hard disc, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory. Accordingly, in the illustrated example the computer program code may be executed from, say, high-speed memory 140.

In the illustrated example, the data management system 100 is arranged to receive data 110. Such data may comprise any data relating to calls within one or more wireless communication networks, for example comprising call service type (e.g. data call, voice call, etc.), call event times (e.g. time of call initiation, time of change of service type, time of call termination, etc.), quality of service information, neighbour cell measurement reports, etc. Such data 110 may further comprise statistical information derived from call event data. The data management system 100 stores the received data 110 within one or more data storage device(s), such as those illustrated generally at 120.

In the illustrated example, the data management system 100 is operably coupled to the data storage device(s) 120 via memory access module 130, which is arranged to receive and implement data access requests (read and write) from the data management system 100 to the data storage device(s) 120. The data storage device(s) 120 may comprise any suitable form of non-volatile mass storage devices, such as magnetic disc drives, solid-state disc drives or the like. The term data storage device used herein may refer to an entire physical data storage device or a logical storage device such as a single partition of a physical data storage device. Alternatively, a logical storage device may comprise multiple partitions arranged across multiple physical data storage devices. Accordingly, the use of the term data storage device is to be understood to encompass both entire physical data storage devices and logical data storage devices (e.g. partitions) unless otherwise indicated.

In the illustrated example, the data management system 100 is further arranged to receive queries relating to data stored within the data storage device(s) 120, for example from one or more client applications 150. Upon receipt of such a query, the data management system 100 is arranged to retrieve data corresponding to the received query from the data storage device(s) and return the retrieved data to, in the illustrated example, the client application 150 from which the query was received, as described in greater detail below.

In the illustrated example, the data management system 100 receives the data as a stream of data 110. A data segmentation component 112 of the data management system 100 is arranged to receive the data stream 110, and perform call data segmentation whereby the data is arranged into individual data records.

In the illustrated example, the data records are then provided to a data record sorting component 114 of the data management system 100, which is arranged to sort the data records according to at least their respective timestamp information. For example, data records may be sorted into predefined, fixed duration event time intervals (e.g. comprising fixed durations of one or more hours). Alternatively, data records may be sorted into predefined periods during the day and/or week and/or month and/or year. For example, such sorting may be arranged to take into account predictable and/or consistent variations in call event density (e.g. fewer calls may occur at night when people are typically asleep, whilst certain periods during the day may typically comprise a higher call volume).

It is contemplated that data records may additionally/alternatively be sorted based on any other criteria. For example, grouping by:
  air interface technology;
  type of data (e.g. summary call data, full call data, etc.);
  call type (e.g. voice, video, data, etc.)
  category of subscriber (e.g. corporate subscribers, private subscribers, VIP subscribers, subscribers with IMSI's ending in a certain number enabling a pseudo random selection of subscribers to be targeted, etc.);
  geographic locations;

user equipment device type (model) or manufacturer; etc.

In the illustrated example, a geolocation component 116 may then perform geolocation in relation to call data records, and spatial information is added to each individual call data record. Geolocation is the identification of the real-world geographical location of an object, such as a mobile communication unit. Geolocation techniques are well known in the art, and as such need not be described in any greater detail herein. Nevertheless, one example implementation of geolocation is described in the Applicant's co-pending International Patent Application No. WO 2010/081658 entitled "GEO-LOCATION IN A WIRELESS COMMUNICATION NETWORK" which is herein incorporated by reference. In the context of the illustrated example of the present invention, geolocation may be performed to determine the location of a mobile communication unit to which a particular call record relates, at the time of the call event to which that call record relates. Additionally/alternatively, where Global Positioning System (GPS) data for a mobile communication unit is available, such GPS data may be used to determine the location of that mobile communication unit.

It will be appreciated that in some alternative examples, such geolocation and addition of spatial information to the data records may equally be performed before the temporal grouping of the data records performed by the data record temporal sorting component 114.

In the illustrated example, a data block assembly component 118 of the data management system 100 is then arranged to assemble the temporally sorted data records into data blocks. An allocation and storage component 160 of the data management system 100 illustrated in FIG. 1 allocates assembled data blocks to one or more of the data storage devices (e.g. magnetic discs) 120. Having allocated a data block to a storage device 120, the allocation and storage component 160 then stores the data block in its allocated storage device 120 by, for example, sending a write access request to the memory access module 130 comprising the data block to be stored, and indicating which data storage device 120 the data block is to be stored in. Upon receipt of such a write access request, the memory access module 130 may then perform the necessary steps to write the data block to the appropriate area in memory (i.e. the appropriate data storage device 120), and may return a confirmation of the writing of the data block to memory upon completion thereof.

The 'retirement' of old data records is an important requirement for data management systems that are required to store large amounts of data, such as data management systems for wireless communication networks, since the continuous storing of large volumes of data requires large amounts of storage space. Thus, data retirement is an important operation in order to free up valuable storage space.

Call related data from wireless communications networks is constantly being generated in great volumes, and thus the available information is constantly being updated. As a result, stored data is typically made redundant after a period of time since more up-to-date information is constantly being made available. It is therefore desirable to 'retire' data that is, say, older than a predetermined 'age'; i.e. that predates a given (progressive) time/date. In addition to retiring data based on the age of the data, it is also often desirable to retire data based on, say, a prioritisation of data whereby data of lesser interest may be retired ahead of data of greater interest.

Figure 2:
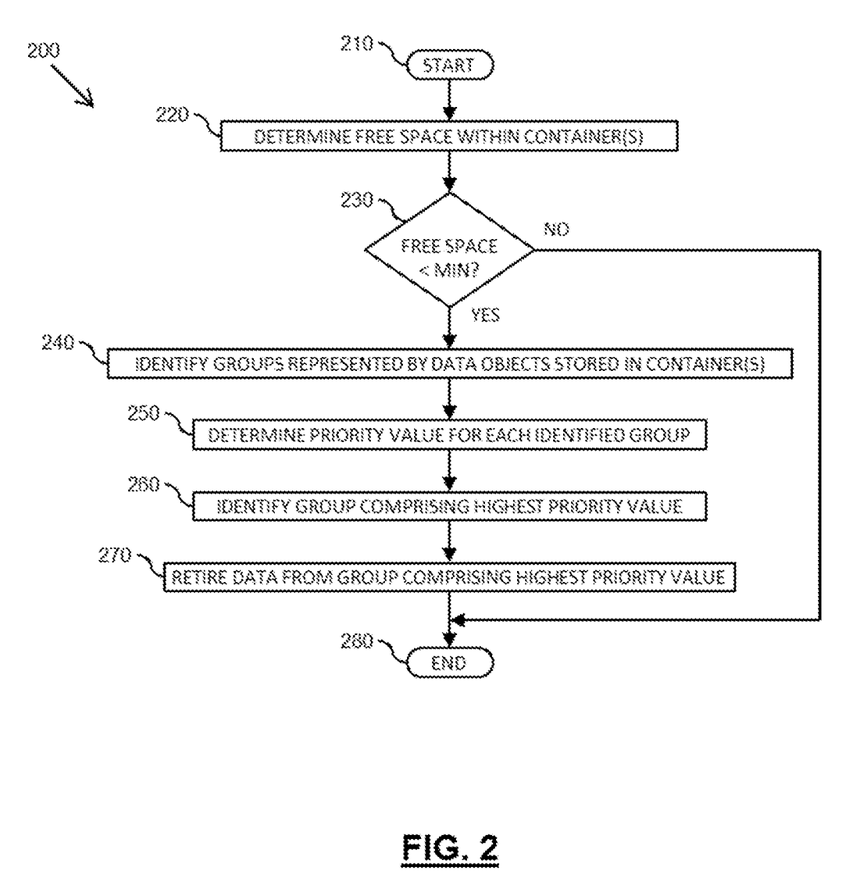
FIG. 2 illustrates a simplified flowchart of an example of a method of managing the retirement of data.

Accordingly, the data management system 100 comprises a data retirement module 170 arranged to retire data stored within the data storage device(s) 120. Referring now to FIG. 2, there is illustrated a simplified flowchart 200 of an example of a method of managing the retirement of data stored within data storage devices, such as may be implemented by the data retirement module 170 illustrated in FIG. 1.

The method starts at 210 and moves on to 220 where at least one free space metric for at least one data storage device(s) is/are determined. Such a free space metric may comprise a proportional free space metric representing, say, a percentage of the respective storage device(s) that is free (i.e. that may be written to). Additionally/alternatively, such a free space metric may comprise an absolute free space metric representing, say, an amount of free storage space within the respective storage device(s). Thus, in the example illustrated in FIG. 1, the data retirement module 170 may be arranged to determine a free space metric for each of the data storage devices 120. The data retirement module 170 may determine such free space metrics in any suitable manner. For example, the data retirement module 170 may be arranged to receive an indication of the amount of free space within each of the data storage devices 120 from the allocation and storage component 160. Alternatively, the data retirement module 170 may be arranged to obtain an indication of the amount of free space within each of the data storage devices 120 from the memory access module 130.

Referring back to FIG. 2, having determined the free space metric(s) for the, or each, storage device, the method moves on to step 230 where the, or each, free space metric, is compared with a minimum free space threshold value. In this manner, it may be determined whether the amount of free space within the, or each, storage device is less than a preconfigured minimum amount. In some examples, it is contemplated that a minimum free space threshold value may be defined and configured for each storage device, such that different minimum free space threshold values may be defined and configured for different storage devices.

In the example illustrated in FIG. 2, if it is determined that the, or each, free space metric for the storage device(s) exceeds the minimum free space threshold value(s), then it may be considered not necessary to retire data in order to free up space for new data. As such, in order to keep 'as much data as possible', in the illustrated example no data is retired under such circumstances. Accordingly, the method ends at 280.

However, if the, or at least one, free space metric for the, or at least one, storage device is less than the respective minimum free space threshold value, then it may be determined that it is necessary to retire data from at least that storage device for which the free space metric therefor is less than the minimum free space threshold value therefor. Accordingly, under such circumstances in the illustrated example the method moves on to step 240 where data object groups represented by data stored within the data storage device(s) for which the free space metric is less than the respective minimum free space threshold value are identified.

For example, and as described in greater detail below, data stored within the data storage device(s) may be stored as data objects. Data objects may comprise, for example, individual data records, blocks of multiple data records, database rows, table partitions, etc. For the example data management system 100 illustrated in FIG. 1, each of the data blocks comprising temporally sorted data records assembled by the data block assembly component 118 may be considered as a data object in accordance with some examples of the present invention.

Each data object stored within the data storage device(s) 120 is assigned to a particular data object group, for example by the allocation and storage component 160. A data object may be assigned to a data object group based on one or more retirement priority characteristics for the data; e.g. one or more characteristics of the data that may be used to define a priority for retaining that type of data ahead of other types of data. Examples of such retirement priority characteristics may comprise, in the case of wireless communication network data, one or more of:

air interface technology;
  type of data (e.g. summary call data, full call data, etc.);
  call type (e.g. voice, video, data, etc.);
  category of subscriber (e.g. corporate subscribers, private subscribers, VIP subscribers, subscribers with IMSI's ending in a certain number enabling a pseudo random selection of subscribers to be targeted, etc.);
  geographic locations;
  user equipment device type (model) or manufacturer;
  etc.

Any suitable grouping of data objects may be implemented/configured, and it is contemplated that such grouping of data objects may be user (e.g. network operator) configurable/changeable. One example of the grouping of data objects based on, for example, the air interface technology used for a call or a segment of a call (where handover from one air interface to another occurs during the call) as well as the type of data may be implemented as follows:

Group 1: Summary call data (3G/UMTS)
  Group 2: Full call data (3G/UMTS)
  Group 3: Summary call data (GSM)
  Group 4: Full call data (GSM)
  Group 5: Summary call data (LTE)
  Group 6: Full call data (LTE)

Each of these groups can have a different relative priority. For example, 3G/UMTS (3$^{rd}$ Generation/Universal Mobile Telecommunications System) calls may be deemed to be of greater importance or interest than GSM (Global System of Mobile communications) calls. Within 3G/UMTS calls, summary data may be deemed to be of greater importance than full call data and likewise, within GSM calls, summary data may be deemed to be of greater importance than full call data. The overall priority, however, could be:

1. 3G summary data
  2. GSM summary data
  3. 3G full call data
  4. GSM full call data Alternatively, whilst still fulfilling the stated 3G vs GSM priority, it could be:

1. 3G summary data
  2. 3G full call data
  3. GSM summary data
  4. GSM full call data An example of the calculation of retirement priority values for each group is described in greater detail below.

Referring back to FIG. 2, and in particular step 240, the data object groups represented by data stored within the data storage device(s) for which the free space metric is less than the respective minimum free space threshold value may be identified in any suitable manner. For example, the data retirement module 170 in the example illustrated in FIG. 1 may be arranged to receive an indication of the data object groups represented within the, or each, data storage device from the allocation and storage component 160. Alternatively, the data retirement module 170 may be arranged to obtain an indication of the data object groups represented within the, or each, data storage device from the memory access module 130. In some examples of the present invention, it is contemplated that it may be assumed that all data object groups are represented within each data storage device, and step 240 of the method of FIG. 2 comprises determining the set comprising all (non-empty) data object groups.

Having identified the relevant data object groups, the method moves on to step 250, where a retirement priority value is determined for each identified data object group. For example, and as described in greater detail below, a retirement priority value for an identified group may be calculated based at least partly on a minimum retention period value for the respective group and/or on a time period for which data objects within the respective group are stored.

Having determined a retirement priority value for each identified data object group, the method moves on to step 260, where a data object group from which data is to be retired is determined based at least partly on the determined retirement priority values. In the illustrated example groups of data objects of a greater interest are given a higher retirement priority value than groups of data objects of a lesser interest. As such, the method of FIG. 2 comprises identifying a data object group comprising a highest retirement priority value.

It will be appreciated that in alternative embodiments, groups of data objects of a greater interest may alternatively be given a lower retirement priority value than other groups of data objects of a lesser interest, and thus step 260 may alternatively comprise identifying data object group comprising a lowest retirement priority value.

Data from the identified group is then retired at step 270 and the method ends and 280.

Advantageously, by determining a free space metric for the, or each, data storage device, and comparing the determined free space metric(s) to one or more minimum free space threshold value(s), the retirement of data objects may be limited to be performed as and when it is necessary to free up space within the data storage device(s) in order to store new data objects. In this manner, the method of FIG. 2 enables an "as much data as possible" retention policy, whereby as much data as possible/practical may be retained for as long as possible/practical, based on the limitations of the amount of storage space available within the storage device(s).

For some examples, it is contemplated that minimum free space threshold value(s) may be configured/set in order to provide a 'buffer' space to cope with a sudden influx of data and thereby avoid the system becoming overloaded. Such a buffer space may be configured/set as appropriate depending on system requirements and/or storage capacity. In some examples, such a buffer space may be configured/set to, say, 5-10% of the storage capacity of the respective data storage device.

Furthermore, retiring data objects based on the retirement priority values of data object groups to which the data objects are assigned enables the retention of data objects comprising data of greater interest to be prioritised ahead of the retention of data objects comprising data of lesser interest.

Figure 3:
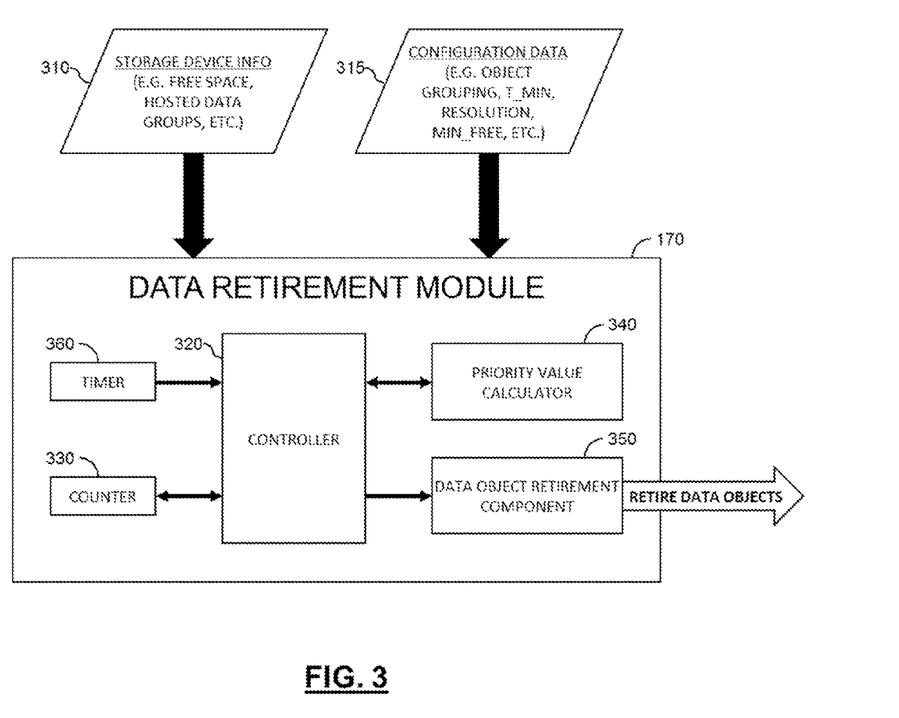
FIG. 3 illustrates a simplified block diagram of an example implementation of a data retirement module.

Referring now to FIG. 3, there is illustrated a simplified block diagram of an example implementation of the data retirement module 170 illustrated in FIG. 1. In the illustrated example, the data retirement module 170 is arranged to receive information relating to the storage device(s) 120, as illustrated generally at 310. Such storage device information 310 may comprise, for example, information indicating an amount of free space within the, or each, storage device 120, an indication of the data object groups hosted/stored within the, or each, storage device 120, etc. Such storage device information 310 may be obtained from, for example, the allocation and storage component 160 and/or the memory access module 130. The data retirement module 170 may further be arranged to receive data retirement configuration information, as indicated generally at 315. Examples of such configuration data 315 will be described in greater detail below.

The data retirement module 170 illustrated in FIG. 3 comprises a controller 320 arranged to implement a method of managing the retirement of data stored within data storage devices such as the data storage devices 120 illustrated in FIG. 1.

Figure 4:
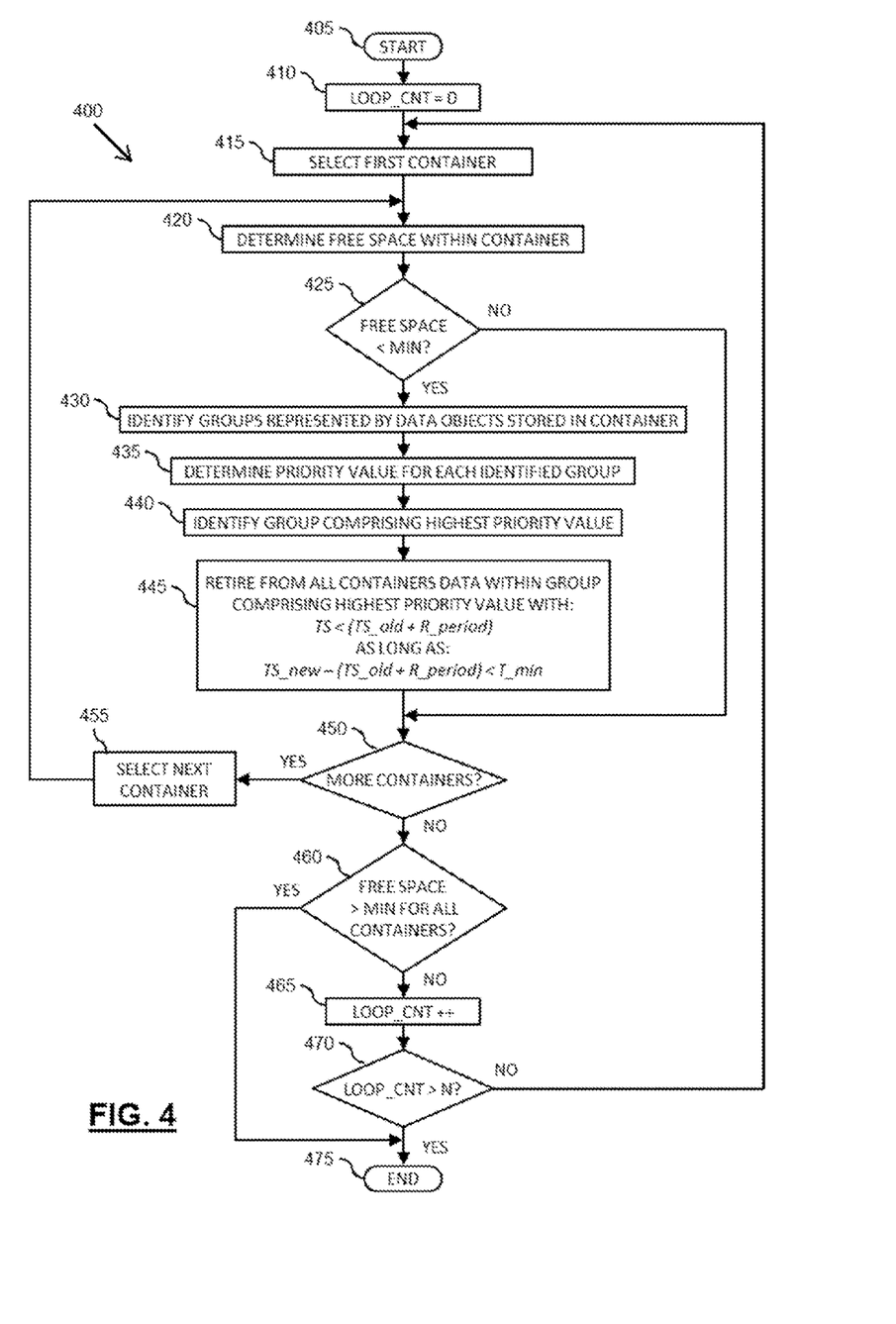
FIG. 4 illustrates a simplified flowchart of a more detailed example of a method of managing the retirement of data.

FIG. 4 illustrates a more detailed example of a method of managing the retirement of data stored within data storage devices such as may be implemented by the controller 320. The method starts at 305 and in the illustrated example initiates a loop counter at 410, such as counter 330 illustrated in FIG. 3, to enable the number of iterations of the method steps to be limited to a predefined number. Next, at step 415, a first memory storage device ('container') is selected. One or more free space metrics for the selected storage device is/are then determined at 420.

Such a free space metric may comprise a proportional free space metric representing, say, a percentage of the selected storage device that is free (i.e. that may be written to). Additionally/alternatively, such a free space metric may comprise an absolute free space metric representing, say, an amount of free storage space within the selected storage device. The free space metric(s) may be determined in any suitable manner. For example, in the example illustrated in FIG. 3, an indication of the amount of free space within the selected data storage device may be included within the storage device information 310.

Referring back to FIG. 4, having determined the free space metric(s) for the selected data storage device, the method moves on to 425, where the determined free space metric(s) is/are compared to one or more threshold value(s) to determine whether the amount of free space within the selected data storage container is less than a predetermined minimum amount. In the illustrated example, if the, or each, free space metric is greater than the respective threshold value, then it may be determined that the selected data storage device comprises sufficient free space and does not require data objects to be retired, and the method jumps to step 450.

Conversely, in the illustrated example if at least one of the free space metrics is less than the respective threshold value then it may be determined that data objects are required to be retired for the selected data storage device, and the method moves on to step 430 where data object groups represented by data objects stored within the selected data storage device are identified.

As described above, each data object stored within the data storage device(s) 120 is assigned to a particular data object group, for example by the allocation and storage component 160. A data object may be assigned to a data object group based on one or more retirement priority characteristics for the data; e.g. one or more characteristics of the data that may be used to define a priority for retaining that type of data ahead of other types of data. Examples of such retirement priority characteristics may comprise, in the case of wireless communication network data, one or more of:

air interface technology;
type of data (e.g. summary call data, full call data, etc.);
call type (e.g. voice, video, data, etc.);
category of subscriber (e.g. corporate subscribers, private subscribers, VIP subscribers, subscribers with IMSI's ending in a certain number enabling a pseudo random selection of subscribers to be targeted, etc.);
geographic locations;
user equipment device type (model) or manufacturer;
etc.

The data object groups represented by data objects stored within the selected data storage device may be identified in any suitable manner. For example, in the example illustrated in FIG. 3, an indication of the data object groups represented by data objects stored within the selected data storage device may be included within the storage device information 310.

Next, at step 435, retirement priority values are determined for each identified data object group. The retirement priority value for an identified group may be calculated based at least partly on a minimum retention period value for the respective group. For example, for each data object group there may be defined within the configuration data 315 a minimum time period (T_min) for data objects within the respective group to be retained. The minimum time period (T_min) for a data object group may define the minimum period of data objects within that group that should be retained. Relative to other data object groups, the minimum time periods (T_min) may reflect the desired temporal relationship goals between the individual groups of data objects; e.g. which has the higher retirement priority and by how much one group is higher in priority than any other group. In this manner, the relative retirement priority may be governed by the minimum time period (T_min) for which data should be kept.

The retirement priority value for an identified group may further be calculated based at least partly on a time period for which data objects within the respective group are stored. For example, timestamp information for data objects stored within the data storage devices may be included within the storage device information 310. Such timestamp information may be implemented in any suitable manner. For example: as a part of the data itself for fine grained objects (e.g. table rows, the objects within an ArrayList); as metadata for coarser grained units (partitions, files); or it could even be incorporated into the naming convention used.

In some examples of the present invention, it is contemplated that the retirement priority value for a data object group may be calculated based at least partly on a ratio of:

$$\text{Retirement Priority} = (TS\_old - TS\_new) / T\_min \quad \text{[Equation 1]}$$

where TS_old is the timestamp of the oldest data for the respective data object group within the selected data storage device, and TS_new is the timestamp of most recent data for the respective data object group within the selected data storage device. Thus, for the example illustrated in FIG. 3, the controller 320 may be arranged to provide the oldest and newest (most recent) timestamp information TS_old and TS_new along with the minimum time period T_min for each data object group to a priority value calculator component 340. The priority value calculator component 340 may then calculate the retirement priority values for each data object group and return the retirement priority values to the controller 320.

Referring back to FIG. 4, having determined the priority values for the identified data object groups, the method moves on to step 440 where, in the illustrated example, the data object group comprising the highest retirement priority value is identified. Data objects from the identified data object group comprising the highest retirement priority value are then retired at step 445.

In some examples of the present invention, for each data object group there may be defined within the configuration data 315 a retirement period (R_period). The retirement period (R_period) represents a length of time spanning which (oldest) data objects within the data object group may be retired in single data retirement operation. This is, in effect, the 'resolution' with which the data objects within a data object group are retired. For example, more important (e.g. higher priority) data may be retired in smaller retirement periods (R_period) than less important data. Thus, at step 445 a 'chunk' of data objects from the identified data object group comprising the highest retirement priority value may be retired comprising all data objects in that group for which:

$$TS < (TS\_old + R\_period) \quad \text{[Equation 2]}$$

where TS is the timestamp of a particular data object.

In some examples of the present invention, data objects may be retired from the identified data object group comprising the highest retirement priority value only as long as, following such a retirement, the remaining (non-retired) data objects cover a minimum period of time. Such a minimum period of time may equal, for example, the minimum time period (T_min). Accordingly, at step 445, data objects may be retired from the identified data object group comprising the highest retirement priority value as long as:

$$TS\_new - (TS\_old + R\_period) < T\_min \quad \text{[Equation 3]}$$

In the illustrated example, data objects from the identified data object group comprising the highest retirement priority value are retired from all data storage devices (containers), and not just from the selected data storage device. In this manner, data objects from a particular group that may be spread across multiple data storage devices in any distribution pattern (i.e. not necessarily equally across all containers, or in strict temporal order), may be removed from all containers in order to avoid, for example, 'orphaning' some of the data, and to reduce the number of iterations required to retire data from multiple data storage devices.

Thus, for the example illustrated in FIG. 3, the controller 320 may be arranged to provide the oldest and newest (most recent) timestamp information TS_old and TS_new along with the minimum time period T_min and the retirement period (R_period) for the data object group comprising the highest retirement priority value to a data object retirement component 350. The data object retirement component 350 may then implement the retirement of the data objects accordingly. For example, the data object retirement component 350 may be arranged to identify those data objects to be retired, and cause the identified data objects to be deleted from the data storage device(s) 120 (e.g. via the data access module 130 or via the allocation and storage component 160). Alternatively, the data object retirement component 350 may simply identify the areas of memory within the data storage device(s) 120 occupied by the data objects to be retired as being free to the data access module 130 and/or the allocation and storage component 160, thereby enabling new data to subsequently be written over the retired data.

Referring back to FIG. 4, having implemented the retirement of the data objects within the data object group comprising the highest retirement priority for the selected data storage device, the method moves on to step 450 where it is determined whether all data storage devices have been selected in the current loop/iteration. If one or more data storage devices have yet to be selected, the method moves on to step 455 where the next data storage device is selected, and the method reverts back to step 420 for the newly selected data storage device.

If all data storage devices have been selected in the current loop/iteration, the method moves on to step 460, where it is determined whether for all data storage devices the amount of free space within the respective data storage container exceeds the respective predetermined minimum amount, as determined at step 425 for each data storage device.

If it is determined that the amount of free space within the respective data storage container exceeds the respective predetermined minimum amount for each data storage device, then it may be determined that all data storage devices comprise sufficient free space and do not require data objects to be retired. Accordingly, the method jumps to step 475 and ends.

Conversely, if it is determined that for one or more data storage devices the amount of free space did not exceed the respective predetermined minimum amount, then the method moves on to step 465 where the loop counter is incremented. Next, at step 470, it is determined whether the loop counter value exceeds a predefined value N (i.e. whether the number of loops/iterations has reached a maximum number). In the example illustrated in FIG. 3, the predefined value N may be defined within the configuration data 315.

If the loop counter value does not exceed the predefined value N, then the method loops back to 415 and steps 415 to 460 are repeated. Conversely, if the loop counter value does exceed the predefined value N, then in order to avoid excessive iterations of the method being performed the method ends at step 475.

In the example illustrated in FIG. 3, the data retirement module further comprises a timer component 360 to enable the controller to schedule periodic execution of a method of managing the retirement of data stored within data storage device(s) 120, such as the method illustrated in FIG. 4. In this manner, the data retirement module may be arranged to automatically initiate periodically the method of managing the retirement of data stored within data storage device(s) 120.

Below is an example of a pseudo code implementation of an algorithm for implementing the method of FIG. 4:
Loop until either all containers have (% free>min) or N iterations completed:

```
{
For all containers:
  {
  Determine container %free space;
  If (container actual %free < container min %free):
    {
    Determine groups represented by data objects stored in container;
    For all groups represented in container:
      Determine ratio of (TS_old - TS_new) / T_min;
    For group with highest ratio:
      Retire group data objects across all containers with:
        TS < (TS_old + R_period);
      As long as:
        TS_new - (TS_old + R_period) < T_min
    }
  }
}
```

Advantageously, the algorithm adapts to varying amounts of free space (% free) within the data storage devices, and can easily adapt to changes in the data storage devices themselves. As a result, the algorithm (and thus the method and apparatus of FIGS. 3 and 4) are able to adapt to changing storage scenarios, such as the addition of a new storage device (e.g. hard disk) to an operational system, the partial or complete failure of one or more storage devices, such as the appearance of bad sectors' on one or more of the disks, or situations where the storage device(s) are shared with another (independent and/or unrelated) system whereby the amount of free space that is available is unpredictable.

Referring back to FIG. 3, it will be appreciated that the configuration data 315 illustrated in the illustrated example enables various parameters for the retirement of data to be configurable. For example, a network operator or other user may configure the various parameters such as, say:

the minimum time period (T_min) for each data object group;

the retirement period (R_period) for each data object group;

the minimum free space threshold (min % free) value for each data storage device;

the maximum number N of iterations (loops) of the method of FIG. 4;

etc.

In this manner, the network operator, or other user, may flexibly adapt the prioritisation of data retention/retirement and the freeing up of space within individual data storage devices.

The network operator, or other user, may also configure/modify the grouping of data objects as required, to enable the retention of certain categories of data objects to be prioritised to facilitate, for example, the detection and diagnosis of specific faults etc. For example, in the example illustrated in FIG. 3, the data retirement module 170 may receive the required data object group information within, say, the storage device information 310 upon each execution of the above algorithm. In this manner, changes to the data object grouping between executions of the algorithm may be taken into consideration.

Figure 5:
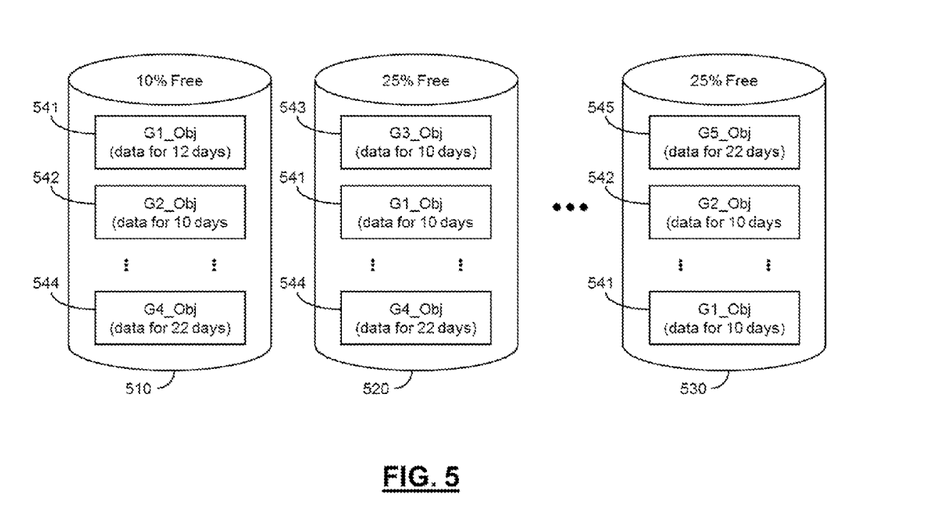
FIGS. 5 and 6 illustrate an example of the retirement of data from data storage devices.

An example of the retirement of data from data storage devices in accordance with the above algorithm (and equally the method illustrated in FIG. 4) will now be described with reference to FIGS. 5 and 6. Referring first to FIG. 5, there are illustrated a plurality of data storage devices 510, 520, 530 within which data objects have been stored. Specifically, FIG. 5 illustrates an example of a state of the data storage devices upon invocation of the above algorithm.

The data storage devices 510, 520, 530 have stored therein data objects that have been grouped together. As described above, the data objects may be assigned to data object groups based on one or more retirement priority characteristics for the data objects. In the illustrated example, a first data storage device 510 comprises data objects that have been assigned to (at least) three data object groups 541, 542, 544, labelled G1_Obj, G2_Obj and G4_Obj respectively. A second data storage device 520 comprises data objects that have been assigned to (at least) three data object groups 543, 541, 544, labelled G3_Obj, G1_Obj and G4_Obj respectively. A third data storage device 530 comprises data objects that have been assigned to (at least) three data object groups 545, 542, 541, labelled G5_Obj, G2_Obj and G1_Obj respectively. Notably, data objects assigned to data object group G1_Obj 541 have been stored within all three data storage devices 510, 520, 530, data objects assigned to data object group G2_Obj 542 have been stored within the first and third data storage devices 510, 530, data objects assigned to data object group G3_Obj 543 have been stored within the second data storage device 520, data objects assigned to data object group G4_Obj 544 have been stored within the first and second data storage devices 510, 520, and data objects assigned to data object group G5_Obj 545 have been stored within the third data storage device 530.

As illustrated in FIG. 5 upon invocation of the above algorithm, the state of the first data storage device 510 is as follows:

contains data for data object group G1_Obj 541 covering a period of twelve days, i.e. (TS_old–TS_new)=12;

contains data for data object group G2_Obj 542 covering a period of ten days, i.e. (TS_old–TS_new)=10;

contains data for data object group G4_Obj 544 covering a period of twenty two days, i.e. (TS_old–TS_new)=22; and has 10% free storage space.

Similarly, the state of the second data storage device 520 upon invocation of the algorithm is as follows:

contains data for data object group G3_Obj 543 covering a period of ten days, i.e. (TS_old–TS_new)=10;

contains data for data object group G1_Obj 541 covering a period of ten days, i.e. (TS_old–TS_new)=10;

contains data for data object group G4_Obj 544 covering a period of twenty two days, i.e. (TS_old–TS_new)=22; and has 25% free storage space.

Finally, the state of the third data storage device 530 upon invocation of the algorithm is as follows:

contains data for data object group G5_Obj 545 covering a period of twenty two days, i.e. (TS_old–TS_new)=22;

contains data for data object group G2_Obj 542 covering a period of ten days, i.e. (TS_old–TS_new)=10;

contains data for data object group G1_Obj 541 covering a period of ten days, i.e. (TS_old–TS_new)=10; and has 25% free storage space.

As previously mentioned, for each data storage device one or more free space metrics are determined. For the example algorithm above, the fee space metric comprises a proportional free space metric (% free) representing a percentage of the respective storage device that is free (i.e. that may be written to), and from the above information the free space metrics for each of the data storage devices 510, 520, 530 upon invocation of the algorithm are:

For first data storage device 510: % $free_1$=10%

For second data storage device 520: % $free_2$=25%

For third data storage device 530: % $free_3$=25%.

Having determined the free space metric (% free) for each storage device 510, 520 530, each free space metric is compared with a minimum free space threshold value for the respective data storage device 510, 520, 530. For the purpose of this example, assume the following minimum free space threshold (min % free) values have been defined for the data storage devices 510, 520, 530 illustrated in FIG. 5:

For first data storage device 510: min % $free_1$=15%

For second data storage device 520: min % $free_2$=20%

For third data storage device 530: min % $free_3$=10%

Upon invocation of the algorithm, it can be seen that the free space metric (% free) for the first data storage device 510, which equals 10%, is less than the minimum free space threshold value (min % $free_1$) therefor.

Having identified that the free space metric (% free) for the first data storage device 510 is less than the minimum free space threshold (min % $free_1$) therefor, groups represented by the data objects stored within the first data storage device 510 are then determined; namely data object group G1_Obj 541, data object group G2_Obj 542 and data object group G4_Obj 544. The retirement priority value for each of these groups is then calculated based on the ratio of (TS_old−TS_new)/T_min.

As previously mentioned, for each data object group a minimum time period (T_min) is defined. For the purpose of this example, assume the following minimum time period (T_min) values have been defined for the data object groups G1_Obj 541, G2_Obj 542 and G4_Obj 544:

For data object group G1_Obj 541: $T\_min_1$=4 days
For data object group G2_Obj 542: $T\_min_2$=4 days
For data object group G4_Obj 544: $T\_min_4$=18 days As identified above, for the first storage device:
(TS_old−TS_new)=12 for data object group G1_Obj 541;
(TS_old−TS_new)=10 for data object group G2_Obj 541; and
(TS_old−TS_new)=22 for data object group G4_Obj 544.

The ratios of (TS_old−TS_new)/T_min for the data object groups G1_Obj 541, G2_Obj 542 and G4_Obj 544 within the first data storage device, and thus the ratio of (TS_old−TS_new)/T_min, and thus the retirement priority value, may therefore be calculated as:

12/4=3 for data object group G1_Obj 541;
10/4=2.5 for data object group G2_Obj 542; and
22/18=1.2 for data object group G2_Obj 544.

The above ratios are important, since they set the relative priority levels of the data object groups, and hence determine which data is retired and how often.

Thus, from these calculated retirement priority values it can be seen that data object group G1_Obj 541 comprises the highest ratio, and thus the highest retirement priority value. Accordingly, data objects from data object group G1_Obj 541 are to be retired, across all data storage devices in the illustrated example. In particular, data objects for which TS<(TS_old+R_period) are retired (as long as TS_new−(TS_old+R_period)<T_min).

For the purpose of this example, assume a retirement period (R_period) of two days has been defined for data object group G1_Obj 541. As such, the oldest two days' worth of data is retired from data object group G1_Obj 541 within all of the data storage devices 510, 520, 530.

Figure 6:
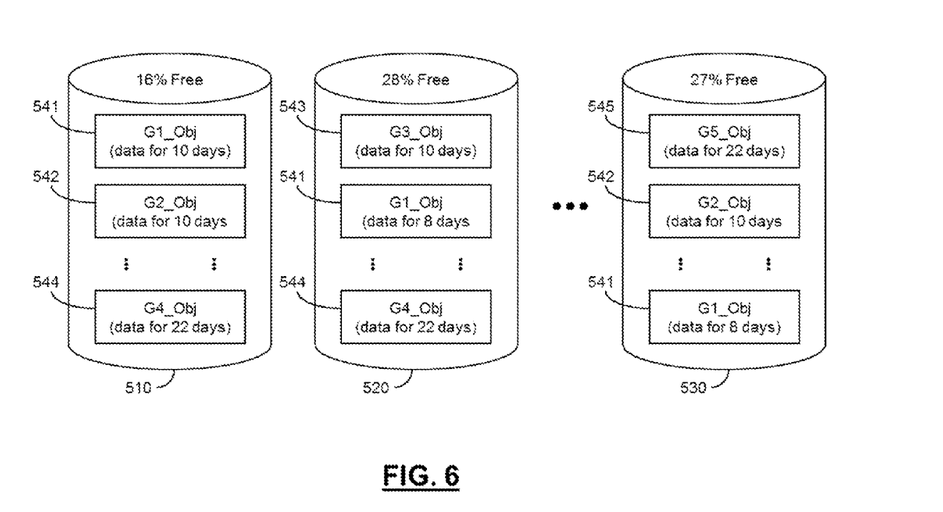

FIG. 6 illustrates a state of the data storage devices following the described single iteration of the above algorithm. As illustrated in FIG. 6 following execution of the above algorithm, the state of the first data storage device 510 is as follows:

contains data for data object group G1_Obj 541 covering a period of ten days, i.e. (TS_old−TS_new)=10;
contains data for data object group G2_Obj 542 covering a period of ten days, i.e. (TS_old−TS_new)=10;
contains data for data object group G4_Obj 544 covering a period of twenty two days, i.e. (TS_old−TS_new)=22; and
has 16% free storage space.

Similarly, the state of the second data storage device 520 following execution of the algorithm is as follows:

contains data for data object group G3_Obj 543 covering a period of ten days, i.e. (TS_old−TS_new)=10;
contains data for data object group G1_Obj 541 covering a period of ten days, i.e. (TS_old−TS_new)=8;
contains data for data object group G4_Obj 544 covering a period of twenty two days, i.e. (TS_old−TS_new)=22; and
has 28% free storage space.

Finally, the state of the third data storage device 530 following execution of the algorithm is as follows:

contains data for data object group G5_Obj 545 covering a period of twenty two days, i.e. (TS_old−TS_new)=22;
contains data for data object group G2_Obj 542 covering a period of ten days, i.e. (TS_old−TS_new)=10;
contains data for data object group G1_Obj 541 covering a period of ten days, i.e. (TS_old−TS_new)=8; and
has 27% free storage space.

As can be seen, the number of days' worth of data for G1_Obj 541 has been reduced within each of the data storage devices 510, 520, 530 by two; i.e. by the retirement period (R_period) for G1_Obj 541. As a result, the amount of free storage space within each of the data storage devices 510, 520 530 has increased. Significantly, in the illustrated example the amount of free storage space within the first data storage device 510 has increased from 10% to 16%, resulting in the amount of free storage space in the first data storage device 510 exceeding the minimum free space threshold (min % $free_1$) of 15% therefor following execution of the algorithm. No further iterations are needed, since all three data storage devices 510, 520, 530 now have sufficient free storage space.

It will be appreciated that some example embodiments of the present invention, such as the method illustrated in FIG. 4, provide at least some of the following advantages over prior art solutions for the retirement of data:

the ability for the maximum possible retention of important and useful data, dynamically, within a given storage space limitation;
the ability to dynamically allocate a relatively greater proportion of the available storage space to 'important' information and a relatively lesser amount (but still some) to lower priority data;
the ability to manage a rolling window of near real time loaded data;
the ability to maximise usage of data storage containers (eg. filesystem, tablespace, raw disc) whilst providing enough space for new data to be stored;
the ability to maintain individual rolling windows for different groups of data;
the ability to dynamically remove or roll-off old data as necessary;
the ability to dynamically adapt to an ever changing storage scenario, either in volume of incoming data or size of available storage; and
a degree of fault-tolerance in the event of a partial failure in one or more storage devices.

Figure 7:
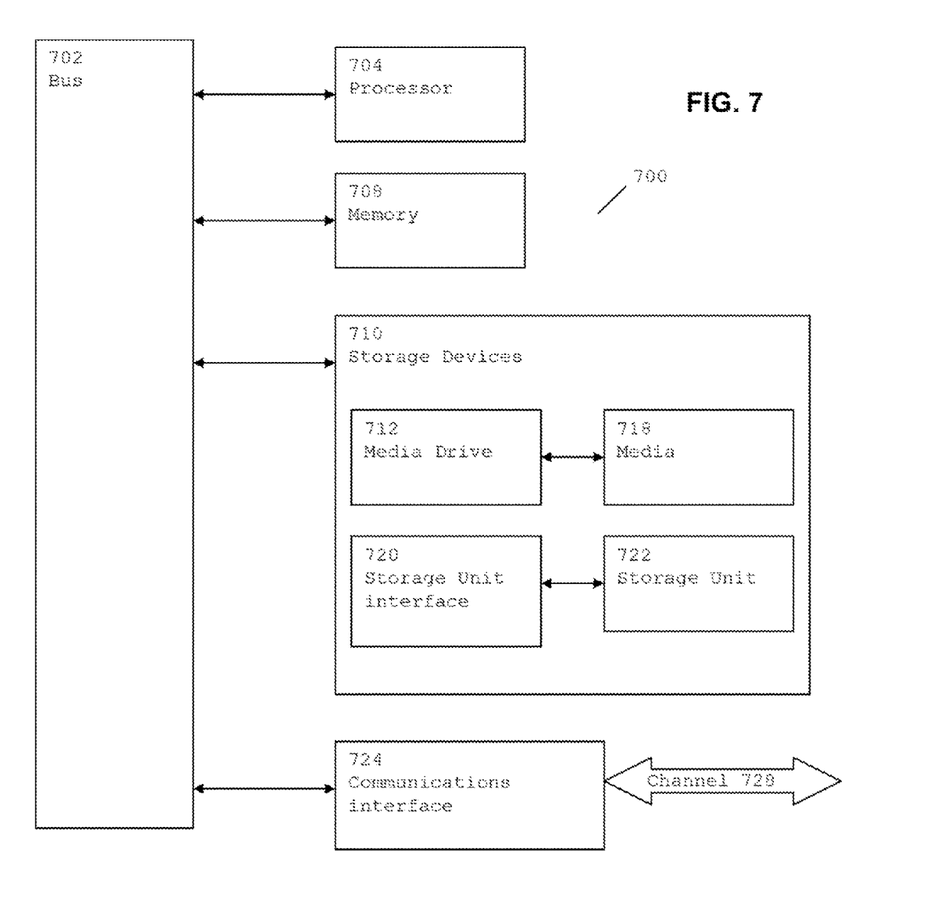
FIG. 7 illustrates a typical computing system that may be employed to implement data processing functionality in embodiments of the invention.

Referring now to FIG. 7, there is illustrated a typical computing system 700 that may be employed to implement data processing functionality in embodiments of the invention. For example, a computing system of this type may be used within the data management system 100 of FIG. 1. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special-purpose processing engine such as, for example, a microprocessor, microcontroller or other control module. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 712. As these examples illustrate, the storage media 718 may include a computer-readable storage medium having particular computer software or data stored therein.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, and optical or other signals capable of being received by communications interface 724. These signals are provided to communications interface 724 via a channel 728. This channel 728 may carry signals and may be implemented using a wireless medium, wire or cable, fibre optics, or other communications medium. Some examples of a channel include a phone line, a cellular phone link, an RF link, a network interface, a local or wide area network, and other communications channels.

In this document, the terms 'computer program product' computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g. libraries for performing standard functions) to do so.

As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being "non-transitory" whereas a signal carrier in transit is to be considered "transitory" notwithstanding that the signal may remain in transit for a lengthy period of time.

In an embodiment where the elements are implemented using software, the software may be stored in a computer-readable medium and loaded into computing system 700 using, for example, removable storage drive 722, drive 712 or communications interface 724. The control module (in this example, software instructions or computer program code), when executed by the processor 704, causes the processor 704 to perform the functions of the invention as described herein.

Furthermore, the inventive concept can be applied to any signal processing circuit. It is further envisaged that, for example, a semiconductor manufacturer may employ the inventive concept in a design of a stand-alone device, such as a microcontroller, digital signal processor, or application-specific integrated circuit (ASIC) and/or any other subsystem element.

It will be appreciated that, for clarity purposes, the above description has described embodiments of the invention with reference to different functional units and processors. However, it will be apparent that any suitable distribution of functionality between different functional units or processors may be used without detracting from the invention. For example, functionality illustrated to be performed by the same processor or controller may be performed by separate processors or controllers. Hence, references to specific functional units are only to be seen as references to suitable means for providing the described functionality, rather than indicative of a strict logical or physical structure or organization.

In particular, in the example illustrated in FIG. 1, the data retirement module 170 has been illustrated and described as comprising an integral part of a 'complete' data management system 100, whereby the data management system further comprises data storage functionality and data retrieval functionality. However, it is contemplated that such a data retirement module is not restricted to being implemented within such a complete data management system. For example, in some examples the data retirement module 170 may be implemented within a data management system that was arranged to solely provide data retirement functionality; other functionality such as data storage and data retrieval being provided by other, separate systems.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the broader spirit and scope of the invention as set forth in the appended claims. Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

We claim:

1. A method comprising:
   determining, by a device, at least one free space metric for at least one data storage device;
   comparing, by the device, the at least one determined free space metric for the at least one data storage device to at least one threshold value; and
   if the at least one determined free space metric for the at least one data storage device satisfies the at least one threshold value, the method further includes:
      identifying, by the device, data object groups represented by data objects stored within the at least one data storage device;
      determining, by the device, a retention priority value for each identified data object group by:
         for each identified data object group, identifying a first value representing an amount of time between a first timestamp associated with an amount of time first data in a respective identified data object group has been stored, and a second timestamp associated with a different amount of time second data in the respective data object group has been stored;
         performing a calculation based on the first value and a second value associated with a minimum period of time to determine a respective third value for each identified data object group; and
         using the respective third value to determine the retention priority value for each identified data object group;
      determining, by the device, at least one data object group for which to retire data objects based at least partly on the determined retention priority values; and
      retiring, by the device, data objects within the determined at least one data object group from the at least one data storage device.

2. The method of claim 1, wherein the at least one determined free space metric comprises at least one of:
   a proportional free space metric, or
   an absolute free space metric.

3. The method of claim 1, further comprising:
   determining at least one data object group for which to retire data objects based on a data object group comprising an extreme retention priority value.

4. The method of claim 1, further comprising:
   retiring data objects comprising a timestamp value older than a retirement cut-off time value.

5. The method of claim 4, wherein the retirement cut-off time value is based on a timestamp value for an oldest data object within the determined at least one data object group+a data removal period value.

6. The method of claim 4, wherein the retirement cut-off time value is based on a timestamp value for an oldest data object within the determined at least one data object group+a data object group specific data removal period value.

7. The method of claim 1, further comprising:
   retiring data objects within the determined at least one data object group from the at least one data storage device as long as:
      a fourth value−(a fifth value+a retirement period)<the minimum period of time,
      the fourth value representing the first timestamp, and
      the fifth value representing the second timestamp.

8. The method of claim 1, wherein data objects are grouped based on one or more of:
   an air interface technology,
   a type of data,
   one or more categories of subscribers,
   one or more geographic locations,
   one or more user equipment device types, or
   one or more user equipment device manufacturers.

9. The method of claim 1, further comprising:
   determining free space metrics for a plurality of data storage devices;
   comparing the determined free space metrics for the plurality of data storage devices to at least one threshold value; and
   if at least one determined free space metric for at least one data storage device satisfies the at least one threshold value, the method further includes:
      identifying data object groups represented by data objects stored within the at least one data storage device for which the free space metric satisfies the at least one threshold value;
      determining a retention priority value for each identified data object group;
         determining at least one data object group for which to retire data objects based at least partly on the determined retention priority values; and
      retiring data objects within the determined at least one data object group from the at least one data storage device for which the free space metric satisfies the at least one threshold value.

10. The method of claim 9, further comprising:
    retiring data objects from all of the data storage devices.

11. The method of claim 9, further comprising:
    comparing the determined free space metrics for the plurality of data storage devices to data storage device specific threshold values.

12. The method of claim 1, further comprising:
    retiring data objects with a timestamp earlier than the first value+a retirement period.

13. The method of claim 1, wherein the method is periodically initiated.

14. A device comprising:
a memory configured to store instructions; and
a processor configured to execute the instructions to:
determine at least one free space metric for at least one data storage device;
compare the at least one determined free space metric for the at least one data storage device to at least one threshold value; and
if the at least one determined free space metric for the at least one data storage device satisfies the at least one threshold value, the processor is further configured to:
identify data object groups represented by data objects stored within the at least one data storage device;
determine a retention priority value for each identified data object group by:
for each identified data object group, identifying a first value representing an amount of time between a first timestamp associated with an amount of time first data in a respective identified data object group has been stored, and a second timestamp associated with a different amount of time second data in the respective data object group has been stored;
performing a calculation based on the first value and a second value associated with a minimum period of time to determine a respective third value for each identified data object group; and
using the respective third value to determine the retention priority value for each identified data object group;
determine at least one data object group for which to retire data objects based at least partly on the determined retention priority values; and
retire data objects within the determined at least one data object group from the at least one data storage device.

15. A non-transitory computer-readable medium storing instructions, the instructions comprising:
one or more instructions which, when executed by a processor of a device, cause the processor to:
determining at least one free space metric for at least one data storage device;
comparing the at least one determined free space metric for the at least one data storage device to at least one threshold value; and
if the at least one determined free space metric for the at least one data storage device satisfies the at least one threshold value, the instructions further include:
one or more instructions to identify data object groups represented by data objects stored within the at least one data storage device;
one or more instructions to determine a retention priority value for each identified data object group by:
for each identified data object group, identifying a first value representing an amount of time between a first timestamp associated with an amount of time first data in a respective identified data object group has been stored, and a second timestamp associated with a different amount of time second data in the respective data object group has been stored;
performing a calculation based on the first value and a second value associated with a minimum period of time to determine a respective third value for each identified data object group; and
using the respective third value to determine the retention priority value for each identified data object group;
one or more instructions to determine at least one data object group for which to retire data objects based at least partly on the determined retention priority values; and
one or more instructions to retire data objects within the determined at least one data object group from the at least one data storage device.

16. The device of claim 14, wherein the processor is further configured to:
determine free space metrics for a plurality of data storage devices;
compare the determined free space metrics for the plurality of data storage devices to at least one threshold value; and
if at least one determined free space metric for at least one data storage device satisfies the at least one threshold value, the processor is further configured to:
identify data object groups represented by data objects stored within the at least one data storage device for which the free space metric satisfies the at least one threshold value;
determine a retention priority value for each identified data object group;
determining at least one data object group for which to retire data objects based at least partly on the determined retention priority values; and
retire data objects within the determined at least one data object group from the at least one data storage device for which the free space metric satisfies the at least one threshold value.

17. The device of claim 14, wherein the processor is further configured to:
retire data objects comprising a timestamp value older than a retirement cut-off time value.

18. The device of claim 17, wherein the retirement cut-off time value is based on a timestamp value for an oldest data object within the determined at least one data object group+a data removal period value.

19. The non-transitory computer-readable medium of claim 15, wherein the instructions further include:
one or more instructions to determine free space metrics for a plurality of data storage devices;
one or more instructions to compare the determined free space metrics for the plurality of data storage devices to at least one threshold value; and
if at least one determined free space metric for at least one data storage device satisfies the at least one threshold value, the instructions further include:
one or more instructions to identify data object groups represented by data objects stored within the at least one data storage device for which the free space metric satisfies the at least one threshold value;
one or more instructions to determine a retention priority value for each identified data object group;
determining at least one data object group for which to retire data objects based at least partly on the determined retention priority values; and
one or more instructions to retire data objects within determined at least one data object group from the at least one data storage device for which the free space metric satisfies the at least one threshold value.

20. The non-transitory computer-readable medium of claim 15, wherein the instructions further include:
one or more instructions to retire data objects comprising a timestamp value older than a retirement cut-off time value.

\* \* \* \* \*